US008495514B1

(12) United States Patent
Ludolph et al.

(10) Patent No.: US 8,495,514 B1
(45) Date of Patent: Jul. 23, 2013

(54) TRANSPARENCY ASSISTED WINDOW FOCUS AND SELECTION

(75) Inventors: Frank E. Ludolph, Menlo Park, CA (US); Paul V. Byrne, Los Altos, CA (US); Hideya Kawahara, Mountain View, CA (US)

(73) Assignee: Oracle America, Inc., Redwood City, CA (US)

(*) Notice: Subject to any disclaimer, the term of this patent is extended or adjusted under 35 U.S.C. 154(b) by 2291 days.

(21) Appl. No.: 11/147,068

(22) Filed: Jun. 2, 2005

(51) Int. Cl.
*G06F 3/048* (2006.01)
(52) U.S. Cl.
USPC .......................................... 715/768; 715/810
(58) Field of Classification Search
USPC ......................................... 715/810, 768, 526
See application file for complete search history.

(56) References Cited

U.S. PATENT DOCUMENTS

| | | | | |
|---|---|---|---|---|
| 5,651,107 | A * | 7/1997 | Frank et al. ................... | 715/768 |
| 6,429,883 | B1 * | 8/2002 | Plow et al. .................... | 715/768 |
| 6,694,486 | B2 * | 2/2004 | Frank et al. ................... | 715/526 |
| 7,956,869 | B1 * | 6/2011 | Gilra ............................. | 345/592 |
| 2004/0090467 | A1 | 5/2004 | Bonura et al. | |
| 2004/0179017 | A1 | 9/2004 | Martyn et al. | |
| 2007/0083911 | A1 * | 4/2007 | Madden et al. ............... | 725/135 |

OTHER PUBLICATIONS

"Giving You Useless Window Transparency Since 2002," Vitrite, Copyright 2002 Ryan VanMiddlesworth, 2 pages.
"Actual Transparent Windows 1.3," ShareTool.com, 2002-2003, 3 pages.

* cited by examiner

*Primary Examiner* — Boris Pesin
*Assistant Examiner* — Matthew Ell
(74) *Attorney, Agent, or Firm* — Robert C. Kowert; Meyertons, Hood, Kivlin, Kowert & Goetzel, P.C.

(57) ABSTRACT

A scene manager, in response to detecting user input indicating an obscured window may initiate transparency assisted window focus and selection. The scene manager may cause the obscured window to be rendered fully opaque while causing any obscuring windows to be rendered highly, or at least partially, transparent allowing the contents of the obscured window to be at least partially visible through the transparent content of the obscuring windows. The scene manager may cause transparency-enabled applications to redraw obscuring windows to be highly transparent. Alternatively, the scene manager may utilize a graphics subsystem capable of rendering the obscuring windows highly transparent. The scene manager may be configured to cause obscuring windows to be rendered multiple times, each time with increasing levels of transparency so that the obscuring windows fade from opacity to transparency.

20 Claims, 10 Drawing Sheets

TRANSPARENCY ASSISTED WINDOW FOCUS AND SELECTION

BACKGROUND OF THE INVENTION

1. Field of the Invention

This invention is related to the field of window-based graphical user interfaces and more particularly to window focus and selection.

2. Description of the Related Art

In window-based graphical user interfaces, windows frequently overlap each other, obscuring the content of some of the windows. Several traditional techniques exist for locating and activating buried, or obscured, windows. A window may be considered buried or obscured if it is at least partially covered by another window. Traditionally, an obscured window may be located and activated by manually moving any obscuring windows out of the way so they no longer obscure the buried window. A user may have to rearrange windows to locate a particular window. For example, a user may move or minimize obscuring windows to see the content of an obscured window.

Other traditional ways of locating an obscured window include selecting or clicking a button or icon on the edge of a screen to activate and bring to the front a buried window and using a keyboard command to cycle through the titles of active windows and then selecting the desired buried window to activate it and bring it to the front. However, when using such keyboard-based mechanisms, a user is generally shown only small icons or abbreviated window titles and the content of obscured windows is not visible to the user. Thus, such keyboard-based mechanisms may not allow a user to differentiate between multiple obscured, but similar, windows. Yet another technique for locating and selecting an obscured window may be to sequentially select each window in turn, thus bringing each window in turn to the front until the desired window's content in viewable. Furthermore, when multiple windows of similar type, title, or content are each obscured, locating one of the windows may be both difficult and time consuming.

Additionally, modal dialog boxes, i.e., dialog boxes that must be dismissed before a user may interact with other windows, frequently obscure the content of windows. In many cases, the user requires access to obscured content in another window in order to properly deal with the modal dialog box, but cannot view the content until the dialog box is dismissed. Thus, a user may spend significant time and effort locating desired windows obscured by windows or other graphical elements.

SUMMARY

Transparency assisted window focus and selection, as described herein, may allow a user to locate and select a desired, obscured window. Transparency assisted window focus and selection may involve making obscuring windows transparent, thus allowing a user to see through them to the content of an obscured window. A user may then quickly and easily locate the specific window desired, thus saving time and reducing window activation errors.

For example, transparency assisted window focus and selection may be activated when a user moves a mouse, or other pointer, over a portion of a buried window. During transparency assisted window focus and selection those windows overlapping, and thus obscuring the desired window, may be made highly transparent. In some embodiments, only those portions of the obscuring windows that actually overlap the buried window may be made transparent, while, in other embodiments, the entire obscuring window may be made transparent. Similarly, placing a mouse over a thumbnail, icon, menu item, or other user-interface element associated with, or representing, an obscured or buried window also may activate or initiate transparency assisted window focus and selection, according to some embodiments. Thus, moving, holding or hovering a mouse over a representation or indication of a window, such as an icon, thumbnail or menu item, may cause any windows obscuring the indicated window highly transparent. While transparency assisted window focus and selection is activated, a user may be able to view the contents of an obscured window and thus confirm that it is the desired window—all prior to actual window selection, focus, or activation. After locating a desired obscured window via transparency assisted window focus and selection, a user may then select or set the focus to the desired window via any normal window selection mechanism, such as by clicking a mouse, or other pointer, on the window.

Additionally, transparency assisted window focus and selection may be utilized to make any obscuring user interface element highly transparent, whether a window, dialog box, alert box, popup-window, icon, thumbnail, or other displayed graphical content. For example, in one embodiment, a user may activate transparency assisted window focus and selection in order to view the contents of a graphical user interface desktop, typically displaying various application and file icons, that may be obscured by other graphical user interface elements, such as windows, dialog boxes, etc. Thus, a user may be able to determine which window, or other user interface element, should be moved, or minimized in order to access user interface elements on a desktop.

A scene manager or window manager, may implement transparency assisted window focus and selection, as described herein. A scene or window manager may, in some embodiments, be part of a window-based graphical user interface and may be responsible for managing the display and arrangement of various user interface elements, such as windows, dialog boxes, alert boxes, and iconic and/or thumbnail representations of windows. In general, a scene manager may be part of a 3D graphical user interface, while a window manager may be a part of a 2D graphical user interface, according to different embodiments. Please note, however, that the terms "scene manager" and "window manager", used herein regarding transparency assisted window focus and selection, may be used interchangeably. A scene manager or window manager may also be responsible for activating or initiating transparency assisted window focus and selection in response to user activity. For instance, in one embodiment, a scene manager may receive or detect user input specifying an obscured window and in response the scene manager may initiate transparency assisted window focus and selection, such as by making an obscured window fully opaque and/or by making obscuring windows highly (or at least partially) transparent in order to allow the contents of the obscured window to be visible through the now transparent obscuring windows. For example, in one embodiment, a scene manager may request or otherwise cause the relevant applications to redraw obscuring windows to make them transparent.

Additionally, in some embodiments, the scene manager may also request or otherwise cause an application associated with the obscured window to redraw the obscured window fully opaque, if it was not already fully opaque. For instance, some windows-based user interfaces may support other uses or forms of transparency and an obscured window may have been rendered with some level of transparency. Therefore, as part of transparency assisted window focus and selection, an obscured window may be redrawn fully opaque, according to some embodiments.

When causing windows, or other user interface elements, to be rendered highly transparent, a scene manager or window manager may specify a desired level of transparency. As noted above, a scene manager may request an application associated with an obscuring window to redraw the window highly transparent, and may specify a level of transparency. Alternatively, the scene manager may be configured, in some embodiments, to communicate a target level of transparency to a graphics subsystem, implemented either in hardware, software or a combination of both, that is capable of ensuring that a window drawn by an application is rendered at the desired level of transparency.

In some embodiments, transparency assisted window focus and selection may involve rendering an obscuring window highly transparent in a single redraw or re-rendering of the window. For example, a scene manager may cause an application to redraw its window with 95 percent transparency. In other embodiments, however, transparency assisted window focus and selection may involve redrawing an obscuring window multiple times, each time with a higher level of transparency until the window is drawing highly transparent. For example, the window may first be redrawn using only a 10-20 percent transparency and may then be redrawn using a 40-50 percent transparency and again redrawn using a high, such as 90-95 percent, transparency. In some embodiments, the number of steps between initial opacity and final transparency may be configurable by a user or system administrator. Additionally, the amount of time or delay between each step between opacity and high transparency may also be configurable, according to one embodiment.

In some embodiments, all windows other than an indicated obscured window, whether or not they actual conceal or obscure part of the obscured window, may be made highly transparent as part of transparency assisted window focus and selection. In other embodiments, however, only those windows actually obscuring an indicated window may be rendered highly transparent. In yet other embodiments, only those portions of obscuring windows that are actually obscuring an obscured window may be rendered highly transparent, leaving those portions of a window not in front of the obscured window opaque.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
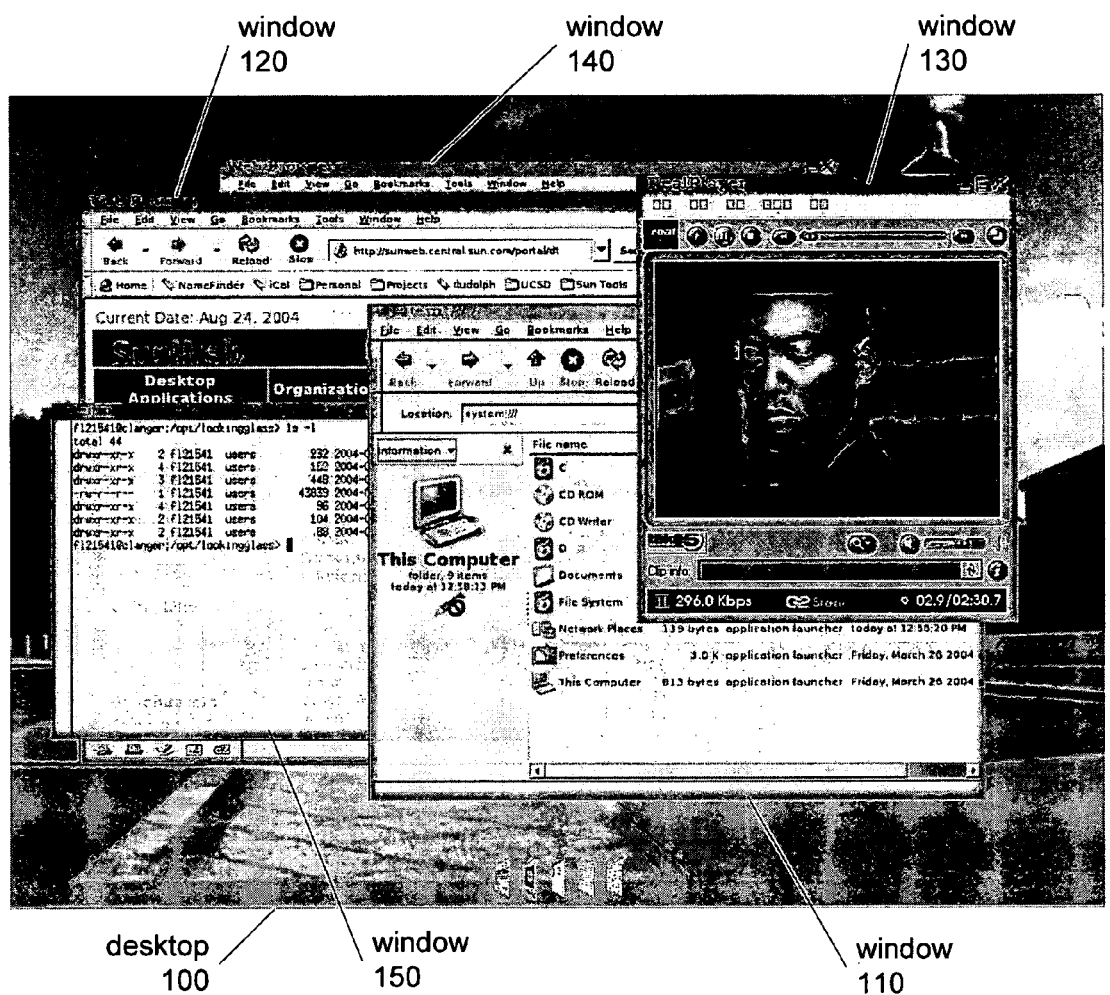
FIG. 1 is a block diagram illustrating a windows-based graphical user interface in which transparency assisted window focus and selection may be implemented, including multiple, overlapping windows, according to certain embodiments.

Transparency assisted window focus and selection, as described herein, may be implemented as part of a window-based graphical user interface, such as the one illustrated in FIG. 1. As noted above, when using multiple windows, or other user interface elements, within a graphical user interface, one or more windows may be partially obscured by other windows or user interface elements. For example, as illustrated in FIG. 1, windows 110, 120, 130 and 150 cover, or obscure, the contents of window 140, thus preventing those contents from being viewed. When using transparency assisted window focus and selection, as described herein, those windows obscuring window 140, such as windows 110, 120, 130 and 150, may be rendered highly transparent, thus allowing the contents of window 140 to be visible through the contents of the obscuring windows.

Please note that the term "highly transparent" is used herein to refer to making a window or other graphical element at least partially transparent as part of transparency assisted window focus and selection. The actually amount of transparency used may vary from embodiment to embodiment or, in some embodiments, may be adjustable or configurable by a user.

Desktop 100, illustrated in FIG. 1, may represent any of various window based user interfaces and/or operating systems. For example, desktop 100 may represent a desktop in Sun OS, Microsoft Windows, MAC OS, Linux, Gnome, KDE, or others, according to various embodiments. Windows 110, 120, 130, 140 and 150 may represent any of various types of graphical user interface elements, such as application windows, dialog boxes, alert boxes, popup windows, etc, according to various embodiments. While transparency assisted window focus and selection is described herein mainly in reference to application windows, please note that the functions, methods and components described herein may also implement transparency assisted window focus and selection for other user interface and/or display elements, such as menus, icons, thumbnail images, 3D objects, etc. Moreover, while mainly described herein in reference to windows belonging to multiple applications, transparency assisted window focus and selection may also, in some embodiments, by applied to multiple windows, or other types of interface elements, of a single application.

As noted above, some graphical user interfaces may include other forms of transparency and thus, as illustrated in FIG. 1, some windows may be rendered with an initial or normal level of transparency, such as illustrated by window 150. Thus, in some embodiments, a slightly transparent window, such as window 150, that is partially obscured by another window, such as window 110, may be rendered fully opaque as part of transparency assisted window focus and selection. Additionally, when utilizing transparency assisted window focus and selection, a user may first indicate one obscured window, such as window 140, thus causing another window, such as window 120, to be rendered highly transparent. The user may then indicate window 120, such as by positioning a mouse cursor over the window, thereby initiating transparency assisted window focus and selection for window 120, which in turn may cause window 120, previously rendered transparent, to be rendered opaque, while also causing those windows obscuring window 120, such as windows 110, 130 and 150 to be rendered highly (or at least partially) transparent, according to some embodiments. In such a situation, window 140, which may have been rendered opaque as part of transparency assisted window focus and selection may or may not be rendered highly transparent since it is behind and thus not obscuring window 120, according to various embodiments. Please note that transparency assisted window focus and selection may be applied to a window that may be only partially obscured rather than totally obscured.

Figure 2A:
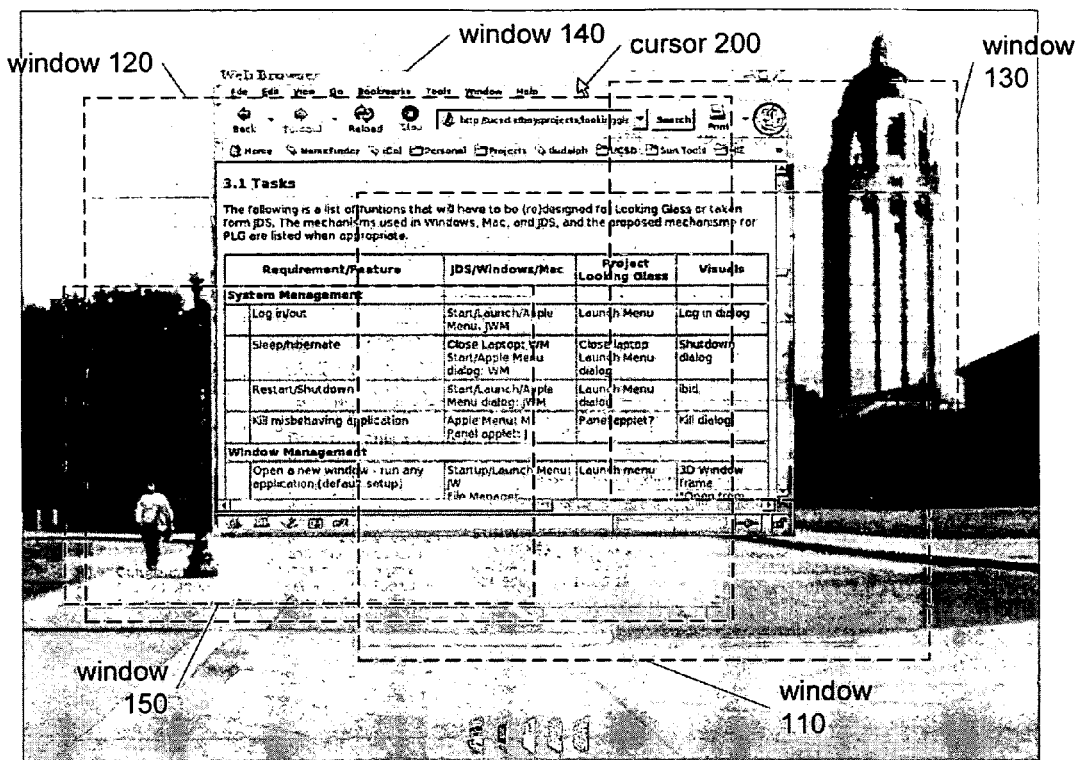
FIGS. 2A-2D are block diagrams illustrating various obscuring windows rendered highly transparent in order to reveal the contents of an obscured window, according to various embodiments.

While FIG. 1, described above, illustrated multiple overlapping windows before activation of transparency assisted window focus and selection, FIGS. 2A-2D illustrate those same windows during various implementations of transparency assisted window focus and selection, according to various embodiments. For example, FIG. 2A illustrates, in one embodiment, the contents of an obscured window 140 made visible through the highly transparent content of obscuring windows 110, 120, 130, and 150 via transparency assisted window selection and focus, as described herein.

As illustrated by FIG. 2A, window 140 is behind and thus obscured by portions of windows 110, 120, 130, 150, and 160. Cursor 200 is over a portion of window 140 that is not covered by the obscuring windows. In response to detecting that cursor 200 is over obscured window 140 (e.g. user positioning the mouse cursor over part of the window), the obscuring windows may be rendered highly transparent in order to make the contents of obscured window 140 visible without actually selecting window 140 or moving window 140 to the front. Additionally, if window 140 was not already opaque, it may be rendered fully opaque to make its contents visible though the now transparent content of obscuring windows 110, 120, 130, 150, and 160. Thus, through transparency assisted window selection and focus, as described herein, the contents of obscured window 140 may be at least partially visible through the obscuring windows, according to one embodiment.

Figure 2B:
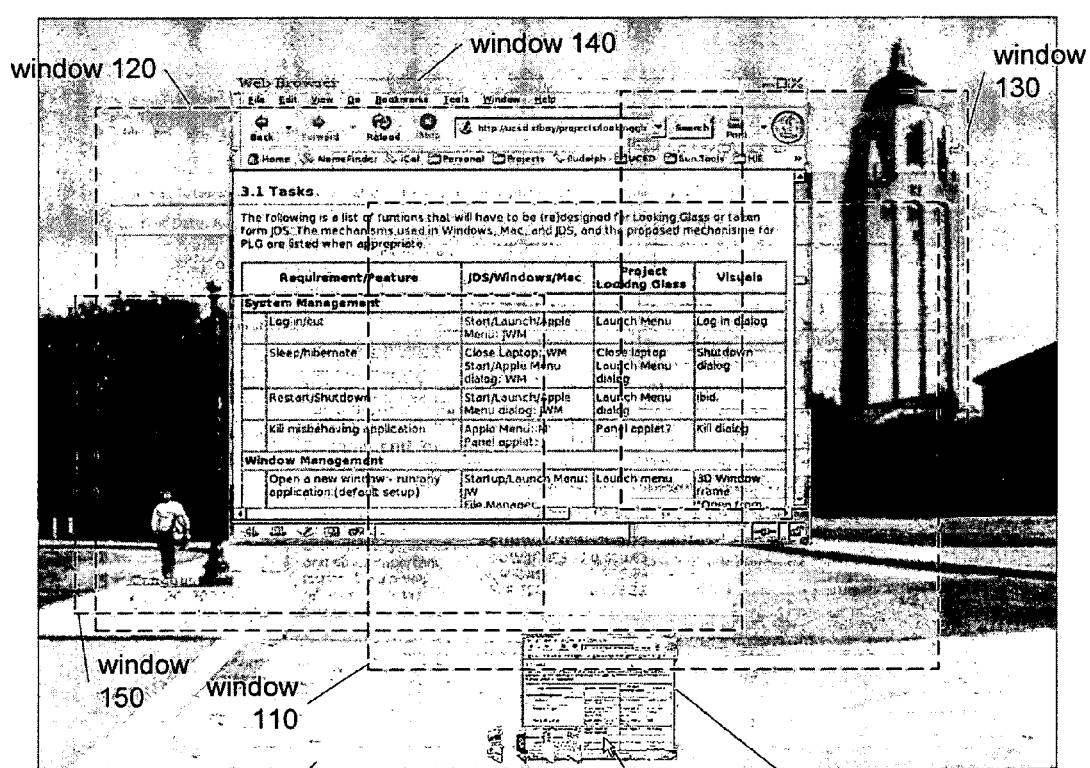
Figure 2C:
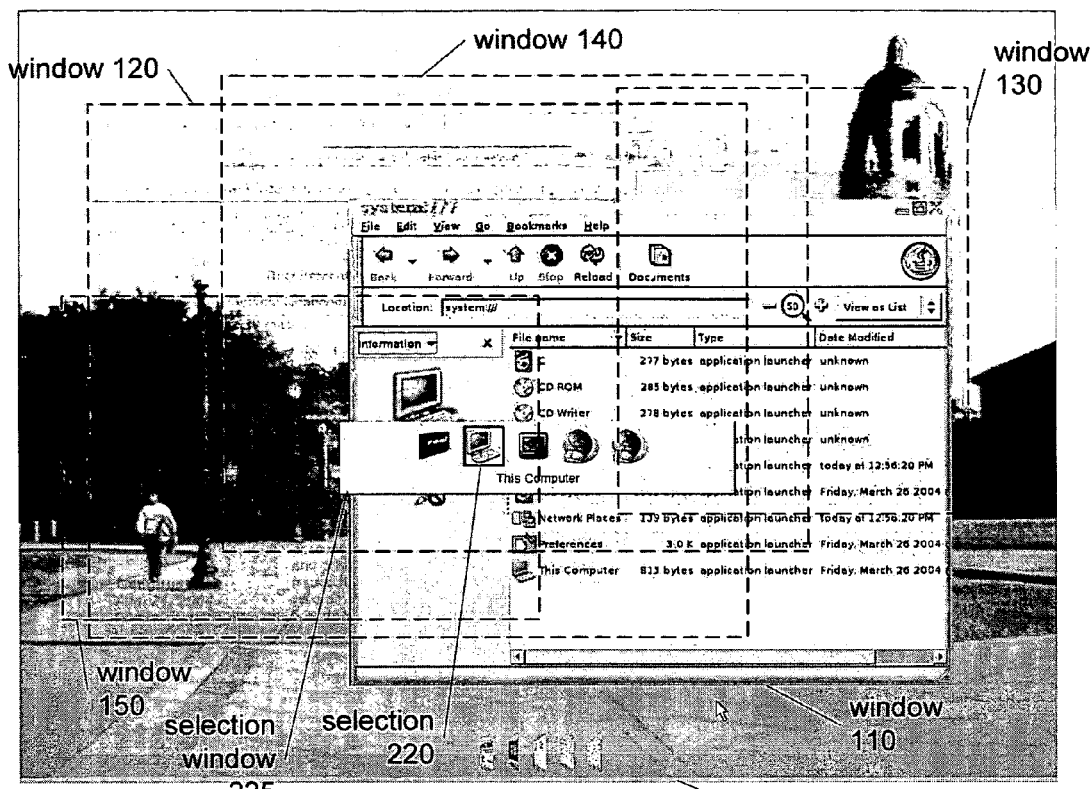
Figure 2D:
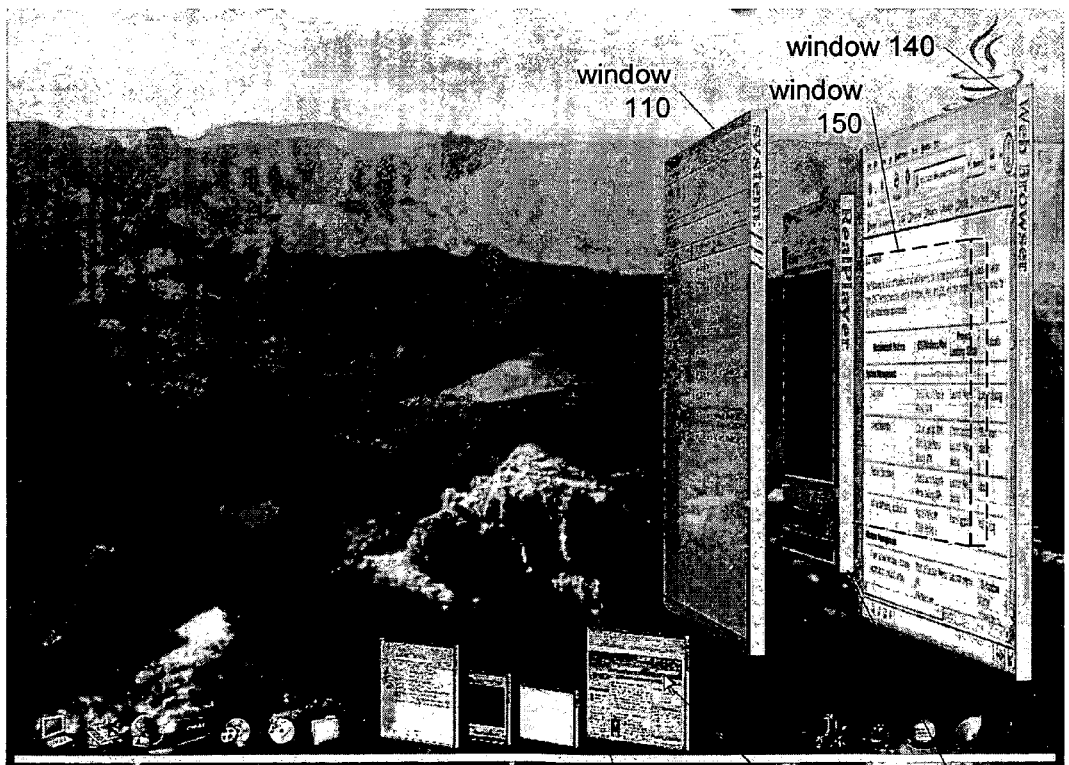

A scene manager or window manager may detect any of various user input mechanisms indicating an obscured window as part of transparency assisted window focus and selection, according to various embodiments. For example, in one embodiment, the user may position the mouse cursor over a portion of the obscured window that is not obscured by other windows, such as illustrated by cursor 200 displayed over window 140 in FIG. 2A. Alternatively, in another embodiment, a user may use a keyboard-based hotkey to indicate a hidden or buried window, such as illustrated by FIG. 2C, discussed in more detail below. In other embodiments, a user may indicate a window via a list, such as in a menu, of window titles and, in yet other embodiments, a user may position the mouse cursor over an icon or other user interface element that refers to or represents an obscured window, as illustrated by FIGS. 2B and 2D. For example, a graphical user interface may include icons along the bottom or sides of the desktop or display, such as in a toolbar, each of which represents a different window and selecting the icon causes the associated window to be selected, various embodiments of which are illustrated in FIGS. 2A-2D. In general, any method of indicating a buried or obscured window, or other obscured graphical element, may be used to initiate transparency assisted window focus and selection, as described herein.

In some embodiments, transparency assisted window focus and selection may always be active, while in other embodiments, the user may be able to selectively activate transparency assisted window focus and selection. For example, in one embodiment, a user holding a specific key combination while moving the mouse may activate transparency assisted window focus and selection. In other embodiments, a menu item, key combination, or other user interface action may be used to toggle whether transparency assisted window focus and selection is active. Thus, a scene manager or window manager may, in some embodiments, be configured to selectively initiate transparency assisted window focus and selection based upon such a user configuration setting. In general, transparency assisted window focus and selection may be activated and/or deactivated in any number of different manners depending upon the specify nature of different embodiments.

When activating or initiating transparency assisted window focus and selection, a scene manager or window manager may delay slightly after detecting user input indicating an obscured window to ensure the user actually intends to initiate transparency assisted window focus and selection, according to some embodiments. In certain embodiments, the scene manager or window manager may only initiate a delay after detecting that a user has stopped moving a mouse cursor, or other pointing device, with the cursor over an obscured window (or over another user interface element representing a window). Implementing such a delay may, in some embodiments, prevent unnecessary redrawing and/or flashing of windows or other graphical elements when a user is merely moving a mouse across an obscured window rather than actually intending to indicate the obscured window as a target for transparency assisted window focus and selection. In other embodiments however, no such delay may be used. Whether or not to use a delay and the length of such a delay may be user configurable and may vary from embodiment to embodiment.

While transparency assisted window selection and focus is described herein as involving separately drawing or rendering each obscuring window as highly transparent, in some embodiments, a combination of multiple windows may be rendered to result in a scene in which an obscuring window may be highly transparent. For example, in some embodiments, portions of several obscuring windows may be combined with portions of other obscuring windows, as well as with portions of an obscured window in order to render a scene in which obscuring windows may appear highly transparent and in which an obscured window may appear fully opaque. For example, the lower right portion of window 140, as illustrated in FIG. 2A, may be obscured by portions of windows 110, 120, and 130. When rendering the obscuring windows highly transparent, those portions of windows 110, 120, and 130 that overlap each other may all be combined together and further combined with the obscured portion of window 140, according to certain embodiments. Thus, a single rendered rectangle that may be only a portion of the entire scene may be rendered based on a combination of multiple obscuring windows and the obscured window. In other words, rather than rendering each obscuring window separately and in its entirety, portions of multiple windows may be combined and rendered as a single action, according to various embodiments.

Furthermore, the level of desired transparency may, in some embodiments, determine the amount of pixel information for the obscured window that is combined with corresponding, obscuring pixel information for one or more obscuring windows. Thus, when rendering an obscuring window highly transparent, a large amount of pixel information from the obscured window may be combined with a smaller amount of pixel information from the obscuring window.

Alternatively, rather than combining relative amounts of pixel information for the obscured and obscuring windows, in one embodiment, the specific color information for target pixel may be determined by combining the color information from pixel information for each window (both obscured and obscuring) and by weighting the color information from the obscured window more heavily than the color information from the obscuring window(s). Thus, the resultant pixel information represents the high transparency for the obscuring window(s) and a high opacity for the obscured window.

FIG. 2B illustrates the same set of windows as illustrated in FIG. 2A, except that cursor 200 is over thumbnail 145, which may refer to or represent window 140. As with FIG. 2A, window 140 may be behind, and thus obscured by, windows 110, 120, 130 and 150, according to the embodiment illustrated by FIG. 2B. In response to detecting the user moving cursor 200 over thumbnail 145, a scene manager may, in some embodiments, cause window 140 to be rendered fully opaque, if it was not already, and may also cause windows 110, 120, 130 and 150 to be rendered highly transparent so that the contents of window 140 may be visible through their respective contents. Please note that window 140 may not have been actually selected, and thus may not have the input focus and may not be redrawn in front of any of the obscuring windows.

Additionally, if portions of thumbnail 145 are obscured by another window or by another graphical element, those elements obscuring thumbnail 145 may also be rendered highly transparent via transparency assisted window focus and selection as described herein. Thus, in some embodiments, both an obscured window and an iconic or thumbnail representation of the obscured window, such as window 140 and thumbnail 145, may be rendered fully opaque, while any windows or other graphical elements obscuring portions of either window 140 or thumbnail 145 may be rendered highly transparent.

Similar to FIGS. 2A and 2B, discussed above, FIG. 2C illustrates a window based user interface including the same windows discussed above regarding FIGS. 2A and 2B. However, FIG. 2C illustrates a keyboard-based mechanism for indicating an obscured window. For example, a graphical user interface may be configured to allow a user to select and/or change the input focus to a window by using a specific key combination. For example, repeating pressing a specific key combination, such as ALT-TAB, may cycle through iconic representations of various windows or other graphical elements, as illustrated by selection 220 in FIG. 2C. When implementing transparency assisted window focus and selection while cycling through such iconic representations of windows, as each window is indicated in turn by the user, the indicted window, such as window 110 in FIG. 2C, may be considered a target for transparency assisted window focus and selection. Thus, in the embodiment illustrated by FIG. 2C, while the user is indicating window 110 via selection 220, window 110 may be rendered fully opaque and obscuring window 130 (and/or other windows) may be rendered highly transparent.

Additionally, in one embodiment, other windows not obscuring portions of window 110, such as windows 120, 140 and 150 may also be rendered highly transparent in order to allow the user to more easily view the contents of the obscured window. In other embodiments, however, only windows actually obscuring window 130 may be rendered transparent. Furthermore, in some embodiments, the iconic representations of windows used as part of a key combination based window selection may themselves obscure part of a window, such as illustrated by FIG. 2C. In such embodiments, the obscuring selection window 225 or other graphical elements, such the iconic representation of windows, may also be made transparent in order to allow the contents of obscured window 110 to be visible. Whether or not to make graphical selection windows, such as selection window 225 illustrated in FIG. 2C, transparent as part of transparency assisted window focus and selection may be configurable by a user or system administrator.

While FIGS. 2A-2C, described above, illustrated windows rendered two-dimensionally, transparency assisted window focus and selection may also be implemented for windows and other user interface elements rendered three-dimensionally, as illustrated in FIG. 2D. As illustrated in FIG. 2D, windows 110, 130, 150, and 140 may be rendered three-dimensionally, according to one embodiment. Additionally illustrated by FIG. 2D, each of windows 110, 120, 140 and 150 may be associated with as a respective thumbnail representation, illustrated in the bottom center of FIG. 2D. Curser 200 is illustrated over thumbnail 145, corresponding to window 140 and thus window 140 may be indicated as a target for transparency assisted window focus and selection, according to some embodiments. As with two-dimensional windows, discussed above, three-dimensional windows that obscure part of all of an indicated window may be rendered highly transparent so that the content of the obscured window may be visible through the transparent content of the obscuring window. Thus, window 150 may be rendered highly transparent in order to allow the obscured content of window 140 to be visible through the transparent content of window 150.

While FIG. 2D illustrates thumbnail representations of windows being used to indicate a target for transparency assisted window focus and selection, other representations of windows may also be used to indicate a target window. For example, as noted above, many window-based operating systems and user interfaces display iconic representations of windows, such as on various toolbars along an edge of the display and user interactions with those iconic representations, such as positioning a mouse cursor over an icon, may be used to indicate a target for transparency assisted window focus and selection. Alternatively, in other embodiments, text representing a window, such as in a textual listing of window titles or a textual menu including titles of windows, may also be used to indicate an obscured window as a target for transparency assisted window focus and selection, as described herein. Furthermore, as described above, in addition to mouse and/or other pointer events, keyboard events may also indicate an obscured window.

Figure 3A:
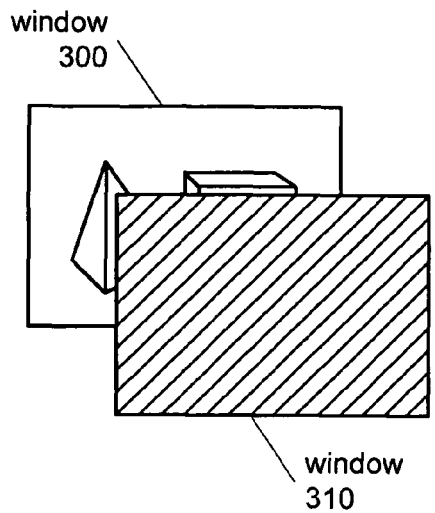
FIGS. 3A-3D are block diagrams illustrating transparency assisted window focus and selection using multiple levels of transparency, in one embodiment.
Figure 3B:
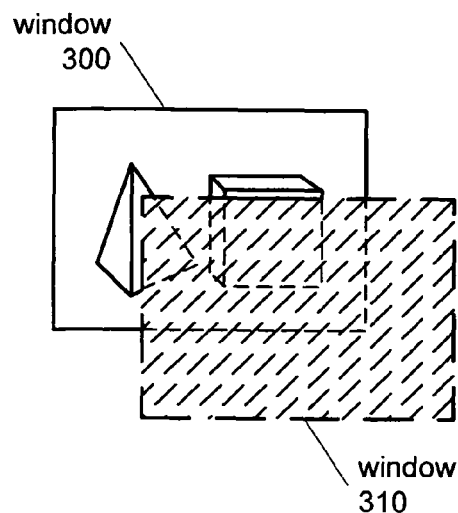
Figure 3C:
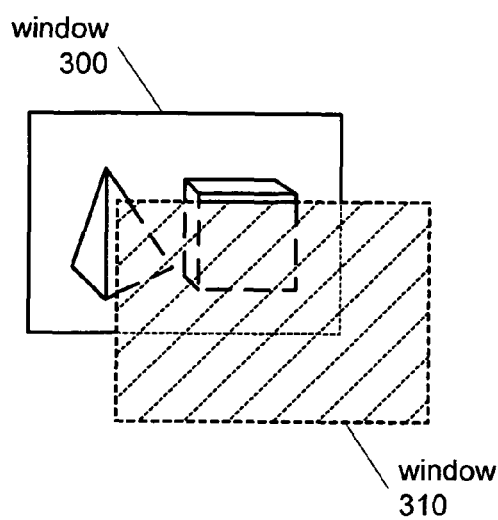
Figure 3D:
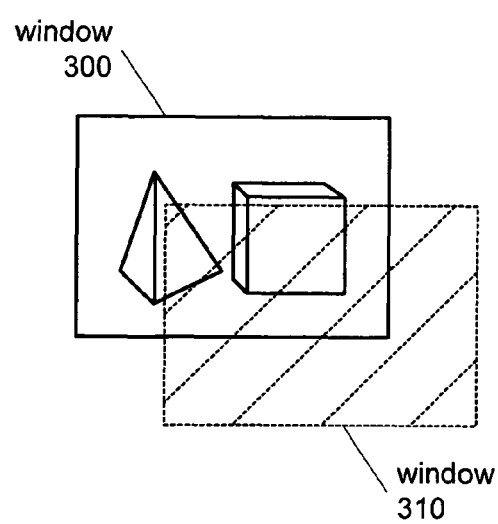

As noted above, transparency assisted window focus and selection may involve rendering obscuring (and obscured) windows multiple times with increasing levels of transparency (or opacity for an obscured window), in certain embodiments. FIGS. 3A-3D are block diagrams illustrating a gradual transition between a fully opaque obscuring window and a highly transparent obscuring window. As illustrated in FIG. 3A, window 310 is obscuring part of the contents of window 300. If, in one embodiment, transparency assisted window focus and selection is applied to the two windows in FIG. 3A, window 310 may be rendered highly transparent so that the contents of window 300 are visible through the transparent contents of window 310. As noted above, the scene illustrated in FIG. 3A may be rendered multiple times, each time applying more transparency to obscuring window 310. Thus, as illustrated by FIG. 3B, some of the obscured content of window 300 is visible through the somewhat transparent contents of window 310. The level of transparency applied to window 310 may be incrementally increased with each rendering until, as illustrated in FIG. 3D, window 310 is highly transparent and the contents of window 300 are visible. Thus, transparency assisted window focus and selection may appear to cause obscuring windows to fade to transparency, according to some embodiments. In other words, an obscuring window may transition from opacity to transparency in a visibly graduated manner.

When causing an obscuring window to fade to high transparency as part of transparency assisted window focus and selection, an application associated with the obscuring window may be directed, or requested, to re-render the obscuring window multiple times and a different level of transparency may be specified with each direction or request. Alternatively, in other embodiments, a window may be given a final target level of transparency and may be responsible for determining one or more intermediate levels of transparency in order to create a fade from opacity to the target level of transparency. However, some embodiments may include applications that are not configured to render windows and/or other graphical elements as transparent. Thus, as noted above, a graphics subsystem or graphics library may be utilized to render windows and other graphical elements highly transparent as part of transparency assisted window focus and selection. Thus, in some embodiments, the graphics subsystem may be given a target level of transparency and may be relied upon to render obscuring windows repeatedly with increasing levels of transparency, as illustrated by FIGS. 3A through 3D. The use of a graphics subsystem as part of transparency assisted window focus and selection is discussed in more detail below regarding FIG. 4.

Figure 4:
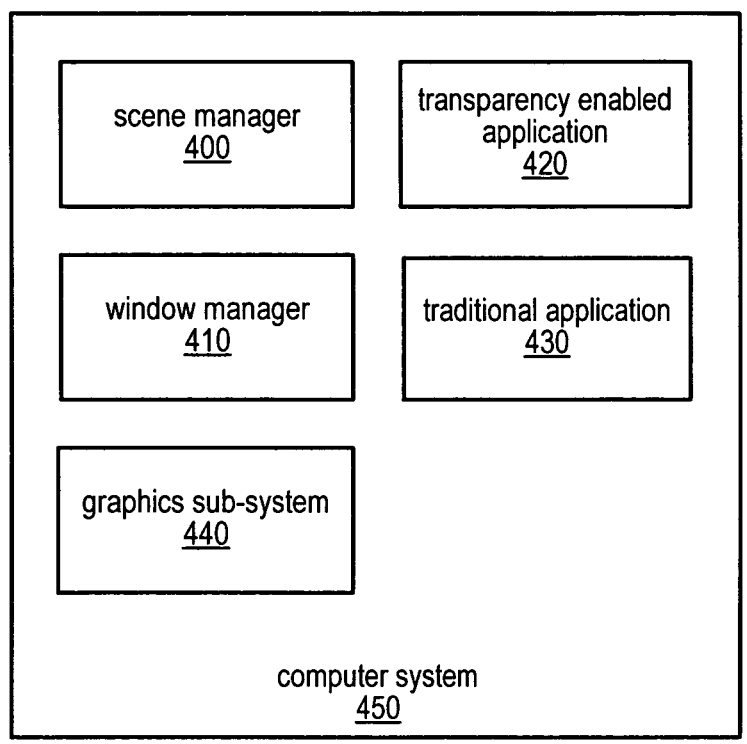
FIG. 4 is a block diagram illustrating, according to one embodiment, various components implementing transparency assisted window focus and selection.

FIG. 4 is a block diagram illustrating various components of window-based user interface and/or operating system that may implement transparency assisted window focus and selection, according to various embodiments. A computer system, such as computer 450 may include various components, either in software, hardware or a combination of both, that may implement transparency assisted window focus and selection, as described herein. For example, a scene manager or window manager, such as scene manager 400 or window manager 410 may manage various aspects, such as the placement, arrangement and display, of application windows and/or other graphical user interface elements in a window-based user interface. Frequently, systems that render windows and/or other user interface elements three-dimensionally may include a scene manager, that may be analogous to a window manager in a system that renders user interface elements two-dimensionally, according to various embodiments.

As noted above, a scene manager, such as scene manager 400, may detect user input indicating an obscured window and may cause one or more windows obscuring the indicated window to be rendered highly transparent so that the obscured contents of the indicated window may be visible through the transparent contents of the obscuring windows. Similarly, a window manager may also perform such functions. In general, the terms "scene manager" and "window manager" may be used interchangeably herein when describing transparency assisted window focus and selection. Thus, a window manager may also detect a user indicating an obscured window as a target for transparency assisted window focus and selection, according to some embodiments.

As also noted above, scene manager 400 and/or window manager 410 may be configured to detect user input indicating an obscured window via any of various methods. For example, in one embodiment, scene manager 400 may intercept mouse events to detect when the mouse is over an obscured window. Alternatively, scene manager 400 may, in some embodiments, be configured to detect certain, possibly configurable, keyboard events indicating an obscured window. For instance, certain user interfaces may allow a user to select a window by cycling through a set of iconic representation of windows or through a list of window titles using specific key combinations, such as ALT-TAB. Thus, in some embodiments, scene manager 400 may be configured to detect a keyboard based indication of a window and may implement transparency assisted window focus and selection in response so that the user may see the obscured content of the indicated window without actually selecting the window.

In other embodiments, scene manager 400 may be configured to detect mouse or keyboard events indicating an iconic or textual representation of an obscured window. For instance, a user may position the mouse cursor over an icon associated with an obscured window, such as over an icon in a toolbar at the edge of a user interface desktop, or in another iconic listing of windows, according to some embodiments. Additionally, scene manager 400 may detect a user moving the mouse over a menu item corresponding to an obscured window and may, in one embodiment, initiate transparency assisted window focus and selection in response.

Scene manager 400 and/or window manager 410 may, in some embodiments, be configured to implement transparency assisted window focus and selection in various ways. For example, in some embodiments, one or more windows obscuring the content of an obscured window may be configured to render windows with transparency and thus may be considered transparency enabled, such as transparency enabled application 420. In such embodiments, scene manager 400 may be configured to request transparency enabled applications associated with obscuring windows to render the associated window(s) highly transparent. Alternatively, as noted above, scene manager 400 may indicate a final target level of transparency and may rely upon a transparency enabled application, such as transparency enabled application 420, to render an obscuring window multiple times with increasing levels of transparency to effect a fade to high transparency.

In other embodiments, one or more obscuring windows may not be transparency enabled and thus may be considered traditional applications, such as traditional application 430 in FIG. 4. Please note that the term "traditional application" as used herein refers only to an application's inability to render windows or other graphical elements with transparency and is not intended to infer any other characteristic of an application. When activating or initiating transparency assisted window focus and selection in response to a user's indication of an obscured window associated with a traditional application, such as traditional application 430, scene manager 400 may be configured to utilize a graphics subsystem, such as graphics subsystem 440. For example, scene manager 400 may cause traditional application 430 to render an obscuring window and may also instruct graphics subsystem to ensure that the obscuring window is rendered highly transparent, such as by intercepting and converting the pixel information rendered by traditional application 430. Alternatively, in one embodiment, scene manager 400 and/or window manager 410, may include functionality to convert or render pixel information for an obscuring window, such as rendered by a traditional application, into highly transparency pixel information, thus making the obscuring window highly transparent.

In another example, according to one embodiment, scene manager 400 may be configured to cause traditional application 430 to render pixel information for an obscuring window to an off-screen bitmap or other off-screen memory location and then may combine that pixel information with pixel information for other obscuring windows and for an obscured window and render the combined pixel information to onscreen or video memory such that the obscuring window appears highly transparent. As various methods for rendering, combining, and/or modifying pixel information to effect transparency are well known in the art of graphical programming, such methods will not be discussed in detail herein. In general any method for rendering pixel information for windows or other graphical elements highly transparent may be utilized as part of transparency assisted window focus and selection, as described herein.

Additionally, in other embodiments, a computer system, such as computer system 450 and or computer system 1000, discussed below, may include a graphics subsystem 440, configured to perform various video and or graphics functions and may also be configured to render windows and or other graphical user interface elements at various level of transparency, including rendering obscuring windows highly transparent. Graphics subsystem 440 may be implemented in software, hardware, or both, according to various embodiments. For example, in one embodiment, graphics subsystem 440 may represent a library, process, device driver, or other collection of software objects or functions in computer system 450 for performing various video and or graphics functions. In another embodiment, graphics subsystem 450 may represent a piece of hardware, such as a video card, and/or one or more corresponding software libraries or device drivers.

In one embodiment, a scene manager, such as scene manager 400, may be configured to cause an application, such as traditional application 430, associated with an obscuring window and a graphics subsystem, such as graphic subsystem 440, to work together to render the obscuring window highly transparent, as described above. For example, traditional application 430 may render the obscuring window in an opaque state to an off-screen bitmap and the graphics subsystem may copy the pixel information for the obscuring window image from the off-screen bitmap to the actual scene, in the process converting the obscuring window image as rendered by the application to result in a highly transparent window image.

Thus, in some embodiments, scene manager 400 and/or window manager 410 may be configured to communicate with and/or interact with a graphic subsystem implemented in software, hardware or both, when implementing transparency assisted window focus and selection. For example, scene manager 400 may, in one embodiment, be configured to instruct graphic subsystem 440 to ensure that certain windows are rendered highly transparent. For instance, scene manager 400 may send an indication of a traditional application, such as traditional application 430, and/or may also indicate a specific obscuring window associated with the traditional application to graphics subsystem 440 and request that graphics subsystem 440 ensure that the rendering of the obscuring window by the traditional application is converted to a highly transparent rendering. Alternatively, as noted above, in other embodiments, scene manager 400 may also be configured to request that graphics subsystem 440 access an off-screen, opaque, rendering by a traditional application of an obscuring window and convert pixel information from that off-screen rendering to highly transparent. In yet other embodiments, scene manager 400 may itself include such functionality similar to that provided by graphics subsystem 440 and may thus be configured to convert an off-screen, opaque, rendering of an obscuring window to be highly transparent, such as by combining pixel information for the obscuring window from the off-screen rendering with pixel information for an obscured window.

Figure 5:
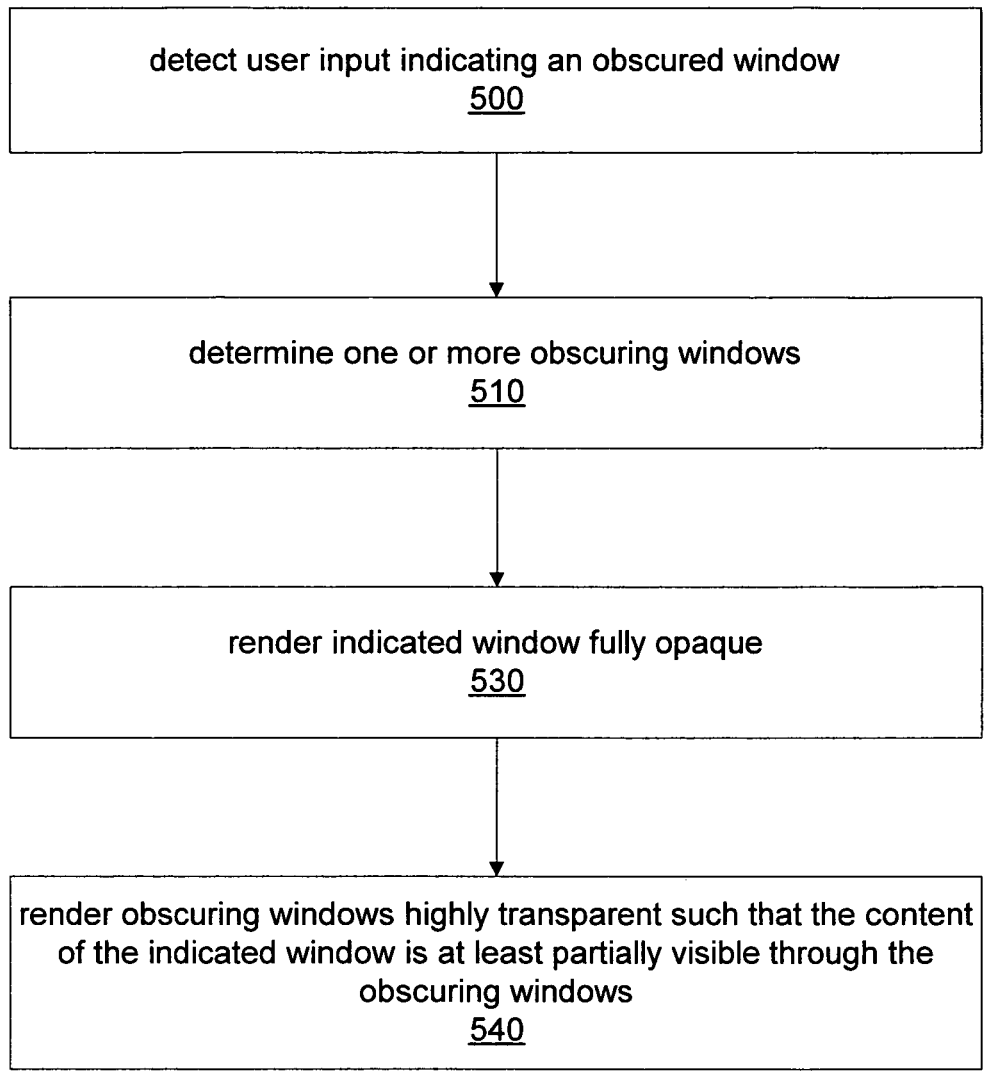
FIG. 5 is a flowchart illustrating one embodiment of a method for transparency assisted window focus and selection.

FIG. 5 is a flowchart illustrating one embodiment of a method for transparency assisted window focus and selection, as described herein. As described above, a scene manager or window manager, such as scene manager 400 may detect user input, such as mouse movement or a specific key combination, indicating an obscured window, such as window 140, described above and illustrated by block 500. For example, in one embodiment, a user may move a mouse, or other pointer, over window 140, thus indicating window 140 as a target for transparency assisted window focus and selection. Alternatively, a user may indicate a window as a target for transparency assisted window focus and selection in various other ways, such as via specific key combinations or via selection of a textual, thumbnail, or iconic representation of the obscured window, according to different embodiments. In response to detecting a user's indication of an obscured window, scene manager 400 may be configured to determine one or more obscuring windows, as illustrated by block 510. Determining the obscuring windows may, in some embodiments, involve comparing the relative portions of the display, desktop or screen occupied by the various windows to determine those portions of windows that overlap portions of the indicated window. As various methods for determining whether windows or other graphics elements overlap are well known, they will not be discussed in detail herein. However, in general, any suitable method for determining whether or not windows and/or graphical elements overlap may be utilized as part of transparency assisted window focus and selection as described herein.

Scene manager 400 may, in some embodiments, be configured to cause the indicated window, such as window 140, to be rendered fully opaque, as illustrated by block 530. For example, window 140 may have been rendered transparent in order to make the contents of another window (obscured by window 140) visible, according to one embodiment. Alternatively, window 140 may have been rendered at least partially transparent for reasons other than transparency assisted window focus and selection, as described above. For instance, various window-based user interfaces may allow users to make certain windows transparent for reasons unrelated to window focus and selection. Regardless of why window 140 may be partially transparent, if indicated by a user as a target for transparency assisted window focus and selection, scene manager 400 may cause window 140 to be rendered fully opaque. Please note however that in some embodiments, window 140 may already be fully opaque and thus some embodiments may not implement rendering obscured windows fully opaque as part of transparency assisted window focus and selection. Additionally, in yet other embodiments, window 140 may remain partially transparent. In certain embodiments, whether or not scene manager 400 renders obscured windows fully opaque may be configurable, either globally for all windows or on a window-by-window basis.

Furthermore, in some embodiments, scene manager 400 may cause the obscuring windows to be rendered highly transparent such that the content of the indicated window is at least partially visible through the obscuring windows, as illustrated by block 540. Thus, the obscured contents of window 140 may be visible through the transparent contents of any obscuring windows.

Figure 6:
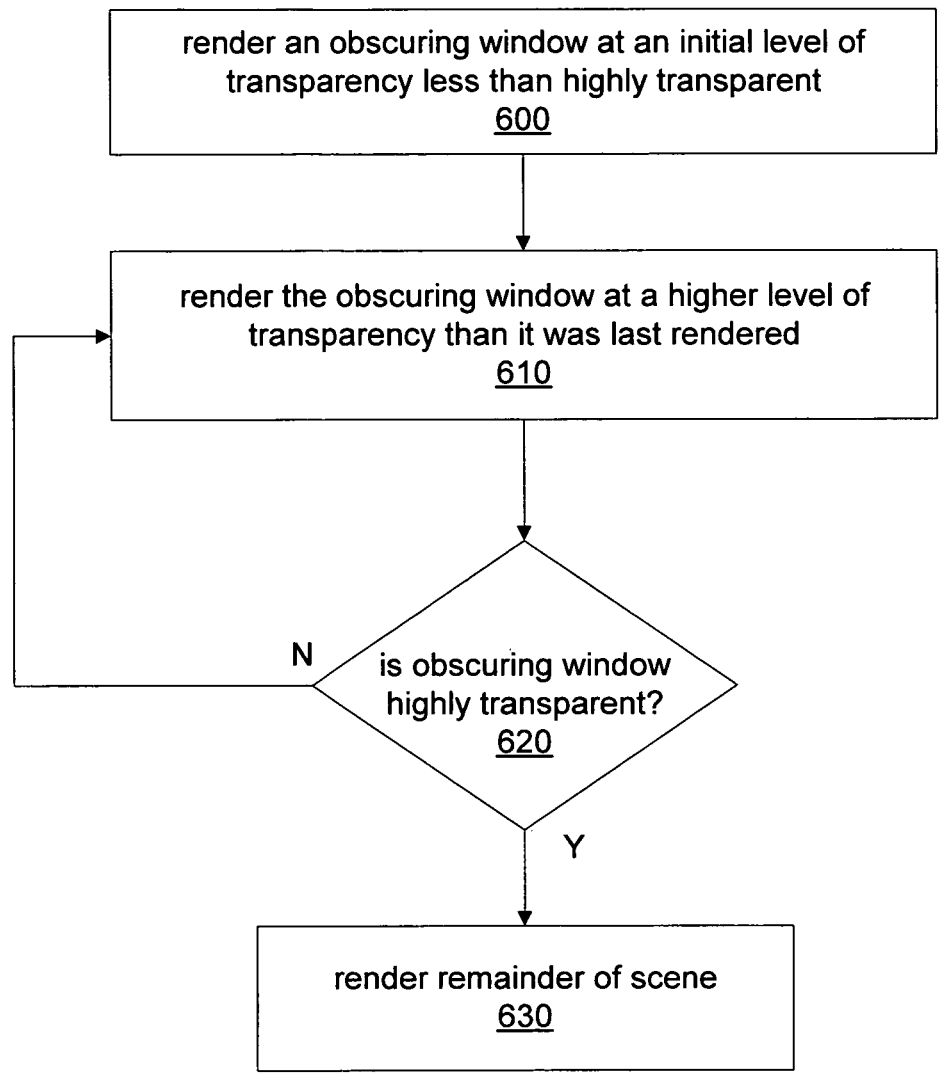
FIG. 6 is a flowchart illustrating one embodiment of a method for rendering an obscuring window highly transparent in transparency assisted window focus and selection.

While the flowchart illustrated in FIG. 5 described one embodiments of the overall method of transparency assisted window focus and selection, FIG. 6 is a flowchart illustrating one embodiment of a method for making an obscuring window highly transparent through multiple renders, each with an increasing level of transparency. Thus, the obscuring window may first be rendered at an initial level of transparency that is less that the ultimately desired level of high transparency, as indicated by block 600. For example, a window may be initially rendered with only 10-20% level of transparency, in one embodiment. In some embodiments, the initial level of transparency may be configurable, either globally for all windows, or for each window individually. Next, the obscuring window may be rendered at a higher level of transparency than the initial level of transparency, but which still may be less transparent than the high level of transparency ultimately desired, as indicated by block 610.

If, as indicated by block 620, the obscuring window is not highly transparent, the window may again be rendered at a yet higher level of transparency. Thus, the obscuring window may be rendered repeated, each time with more transparency, until it is finally rendered highly transparent. When rendering multiple obscuring windows highly transparent, the scene manager may, according to some embodiments, render each window at each level of transparency before moving on to a higher level of transparency. Thus, all obscuring windows may appear to transition from opaque to highly transparent at the same rate.

In other words, the obscuring window may, in some embodiments, be rendered multiple times when making it highly transparent, thus causing the obscuring window to fade to high transparency. The actual fading of an obscuring window to highly transparent may happen quite quickly or more slowly, according to various embodiments. In some embodiments, the number of transitions and the length of time between each transition may be user configurable, while, in other embodiments, such variables may be fixed. Once the obscuring window is rendered highly transparent, the remainder of the scene may be rendered, as indicated by block 630.

Figure 7:
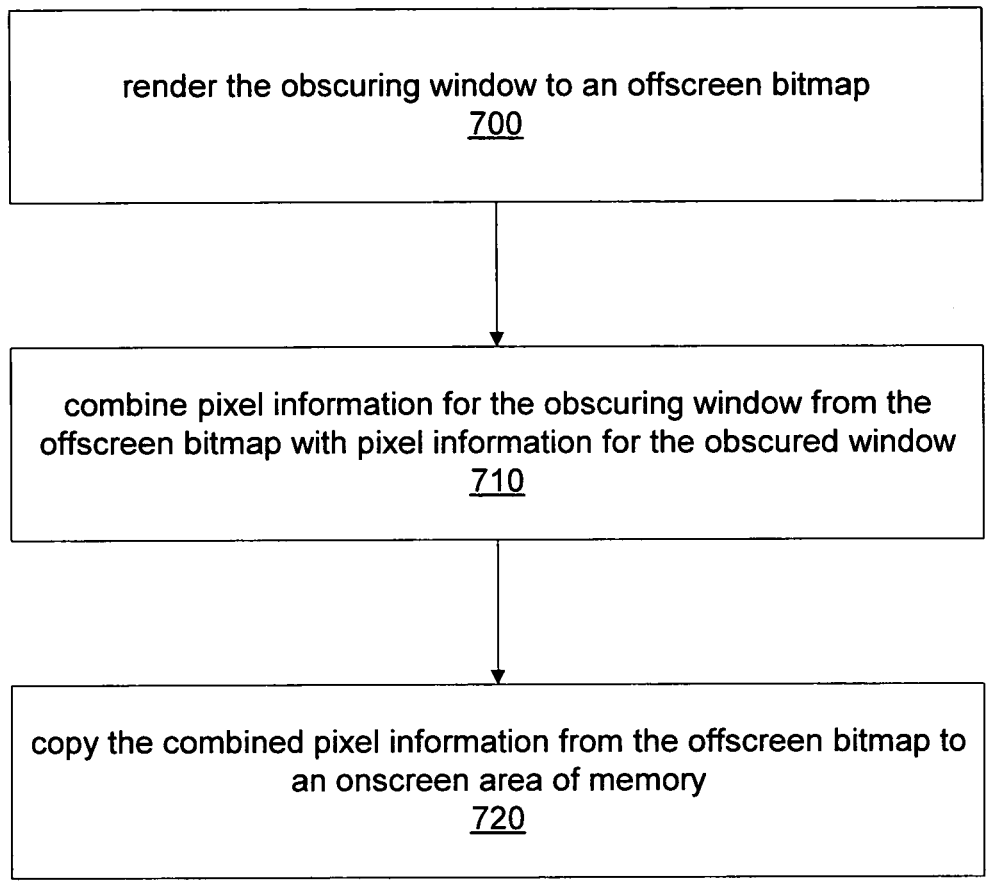
FIG. 7 is a flowchart illustrating one embodiment of a method for using multiple transparency levels when rendering an obscuring window highly transparent.

FIG. 7 is a flowchart illustrating one embodiment of a method for rendering a window highly transparent, as described herein. When causing an obscuring window to be rendered highly transparent, scene manager 400 may request or instruct an application associated with an obscuring window render the obscuring window. As noted above, some embodiments may include traditional applications incapable of rendering windows or other graphical elements with transparency. Thus, an application associated with an obscuring window may render the obscuring window to an off-screen bitmap, as illustrated by block 700, or to another area of memory configured for storing rendered pixel information that is not reflected on the computer screen. When rendering off-screen, the rendered pixel information may be stored in memory in the same format as used when rendering for on-screen display, thus allowing manipulation of the rendered pixel information before it is displayed on screen, according to certain embodiments. Pixel information rendered off-screen for the obscuring window may be combined with pixel information for the obscured window, as illustrated by block 710, in order to have the resulting pixel information, when copied on screen (or to video memory), represent a highly transparent view of the obscuring window allowing the contents of the obscured window to be at least partially visible. The combination of pixel information for the obscuring window and the obscured window may be rendered, or copied, from the off-screen memory area to an on screen memory area, as illustrated by block 720.

Figure 8:
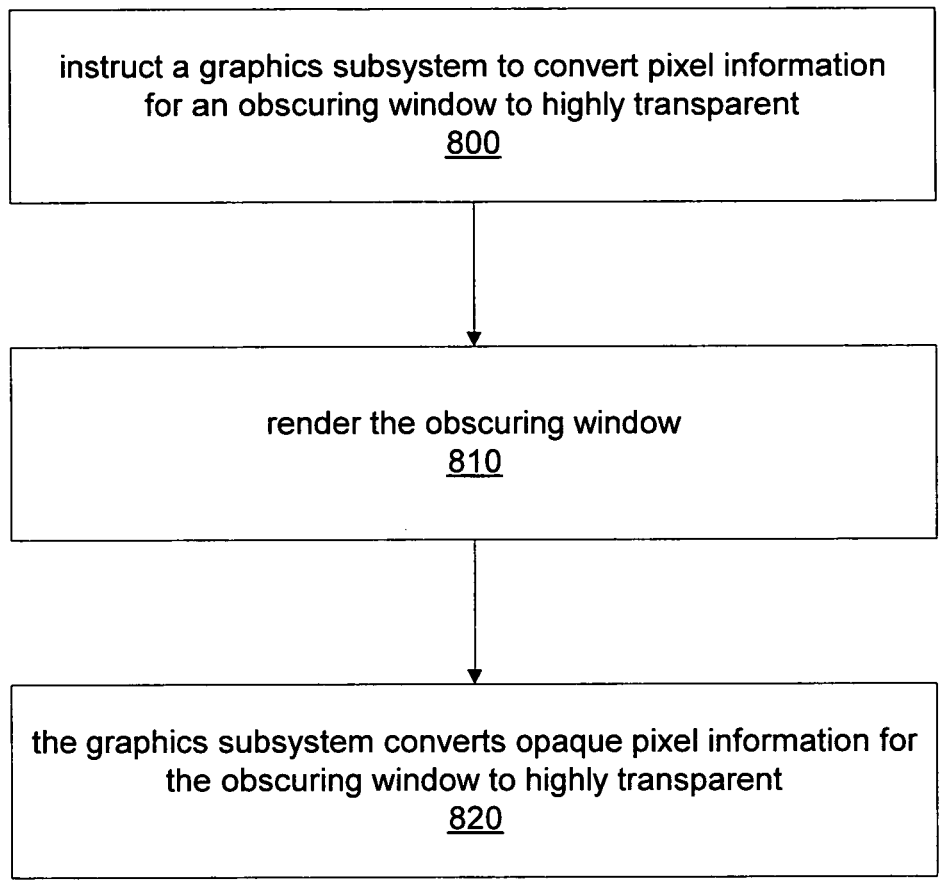
FIG. 8 is a flowchart illustrating one embodiment of a method for transparency assisted window focus and selection including a transparency aware graphic subsystem.

FIG. 8 is a flowchart illustrating one embodiment of another method for making an obscuring window highly transparent. A scene manager, such as scene manager 400, may instruct a graphics sub-system, such as graphic sub-system 440, to convert pixel information rendered for an obscuring window to be highly transparent, as indicated by block 800. For example, a graphics sub-system, such may be implemented in hardware, software or both, may be instructed to modify pixel information rendered for a particular obscuring window such that in a resulting display the obscuring window appears highly transparent. An application associated with the obscuring window may then render the obscuring window fully opaque, as indicated by block 810. For example, the application may not be capable of rendering the window with any level of transparency, and instead may only be configured to render the window fully opaque.

Graphics subsystem 440 may then convert the rendered pixel information highly transparent, as indicated by block 820 according to one embodiment. For instance, graphic subsystem 440 may intercept the output of the application's rendering and combine the rendered pixel information with pixel information for an obscured window in order to render the obscuring window highly transparent causing the content of the obscured window to be at least partially visible through the obscuring window, according to one embodiment. In some embodiments, as noted above, the application may render the obscuring window to an off-screen bitmap and the graphics subsystem may be configured to access that off-screen bitmap to combine the pixel information with pixel information from the obscured window. In general, any manner and/or method of combining the pixel information from obscured and obscuring windows in order to make the obscuring window appear transparent may be utilized with the method illustrated by FIG. 8.

In some embodiments, as described above, an obscuring window may be rendered multiple times in order to have the window appear to fade from opaque to highly transparent. When utilizing a graphics subsystem to make an obscuring window highly transparent, a scene manager, such as scene manager 400, may be configured to specify a level of transparency for each rendering during the fade. In other embodiments, however, the scene manager may specify the final level of transparency and the number of individual stages for the fade from opacity to high transparency and rely upon the graphic subsystem to render the obscuring window with appropriately degrees of transparency to achieve the fade.

As described above, transparency assisted window focus and selection may allow a user to easily locate and select a particular window even when other windows obscure the desired window.

Figure 9:
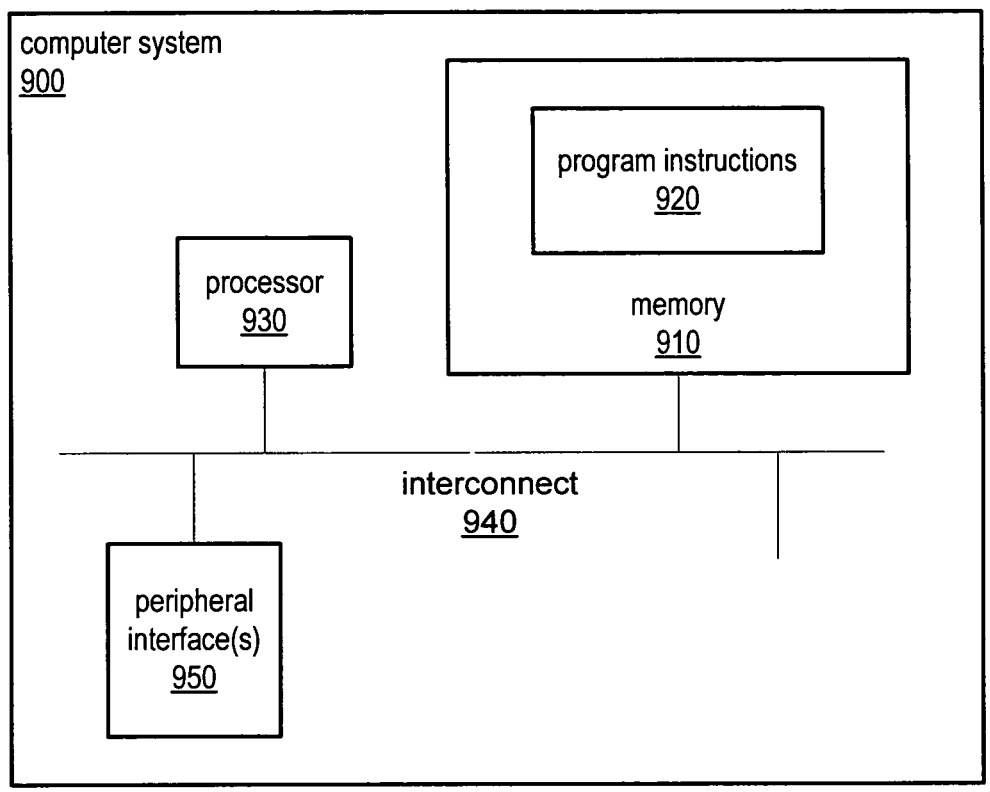
FIG. 9 is a block diagram illustrating an exemplary computer system capable of implementing transparency assisted window focus and selection, according to one embodiment.

FIG. 9 illustrates a computing system capable of implementing transparency assisted window focus and selection, as described herein and according to various embodiments. Computer system 900, which may also be computer system 450, described above, may be any of various types of devices, including, but not limited to, a personal computer system, desktop computer, laptop or notebook computer, mainframe computer system, handheld computer, workstation, network computer, a consumer device, or in general any type of computing device capable of displaying various windows and or user interface elements. Computer system 900 may include at least one processor 930. Processor 930 may couple across interconnect 940 to memory 910.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to implement transparency assisted window focus and selection, as described herein. In certain embodiments memory 910 may include program instructions configured to implement a scene manager or window manager, such as scene manager 400 or window manager 410. In such embodiments, scene manager 400 and/or window manager 410 may include program instructions configured to implement transparency assisted window focus and selection, as described herein. Memory 910 may also include, in some embodiments, program instructions configured to implement a graphics subsystem, or part of a graphics subsystem, such as graphics subsystem 440, configured to implement parts or all of transparency assisted window focus and selection, as described herein.

Additionally, in some embodiments, computer system 900 may include peripheral interface(s) 950 coupled to interconnect 940 that may connect to and allow processor 930 to communicate with any of various peripheral devices, such as a keyboard, mouse, or other input devices. Computer system 900 may also include one or more hardware graphics subsystems, such as graphics subsystem 440, which may include a video card, video accelerator, or other graphics hardware configured to perform some or all of transparency assisted window focus and selection, according to various embodiments.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method for a computer system user interface, comprising:
   detecting user input indicating one window of a plurality of windows, wherein respective portions of one or more others of the plurality of windows fully obscure at least a portion of the indicated window; and
   in response to said detecting user input indicating said one window, rendering each of the one or more obscuring windows at least partially transparent such that after said rendering each of the obscuring windows, the content of the indicated window is at least partially visible through the respective portions of the obscuring windows that previously fully obscured the portion of the indicated window, wherein said rendering does not change the order of the plurality of windows.

2. The method of claim 1, wherein one or more of the plurality of windows are rendered three-dimensionally as part of a three-dimensional graphics scene.

3. The method of claim 1, further comprising in response to said detecting user input, rendering the indicated window fully opaque.

4. The method of claim 1, wherein said detecting user input comprises detecting one or more mouse events.

5. The method of claim 4, wherein said detecting one or more mouse events comprises detecting positioning of a mouse cursor over the indicated window.

6. The method of claim 4, wherein said detecting one or more mouse events comprises detecting positioning of a mouse cursor over an icon corresponding to the indicated window.

7. The method of claim 1, wherein said detecting user input comprises detecting input indicating a menu item corresponding to the indicated window.

8. The method of claim 1, wherein said detecting user input comprises detecting one or more keyboard events.

9. The method of claim 1, wherein said rendering each of the one or more obscuring windows comprises, for each obscuring window, an application associated with the obscuring window rendering the obscuring window as at least partially transparent.

10. The method of claim 1, wherein said rendering each of the one or more obscuring windows comprises, for at least one of the one or more obscuring windows:
    an application associated with the obscuring window rendering pixel information for the obscuring window to an off-screen bitmap; and
    combining the pixel information from the off-screen bitmap with pixel information for the indicated window; and
    rendering the combined pixel information.

11. The method of claim 1, wherein said rendering each of the one or more obscuring windows comprises rendering each obscuring window multiple times with an increased level of transparency for each rendering resulting in a visibly graduated change from opacity to transparency.

12. The method of claim 1, wherein said rendering each of the one or more obscuring windows comprises, for at least one of the one or more obscuring windows:
    an application associated with the obscuring window rendering the obscuring window; and
    a graphic subsystem converting pixel information resulting from said rendering the obscuring window to be at least partially transparent.

13. A system, comprising:
    a processor; and
    a memory coupled to the processor, wherein the memory stores program instructions executable by the processor to:
      detect user input indicating one of a plurality of windows, wherein respective portions of one or more others of the plurality of windows fully obscure at least a portion of the indicated window; and
      in response to said detecting user input indicating one of the plurality of windows, rendering each of the one or more obscuring windows to be at least partially transparent such that after said rendering each of the obscuring windows, the content of the indicated window is at least partially visible through the respective portions of the obscuring windows that previously fully obscured the portion of the indicated window, wherein said rendering does not change the order of the plurality of windows.

14. The system of claim 13, wherein the program instructions are further executable to render one or more of the plurality of windows three-dimensionally as part of a three-dimensional graphics scene.

15. The system of claim 13, wherein the program instructions are further executable to render the indicated window fully opaque in response to said detecting user input.

16. The system of claim 13, wherein as part of rendering each of the one or more obscuring windows the program instructions are further executable to, for at least one of the one or more obscuring windows, cause an application associated with the obscuring window to render the obscuring window at least partially transparent.

17. The system of claim 13, wherein as part of said rendering each of the one or more obscuring windows the program instructions are further executable to, for at least one of the one or more obscuring windows:
   render pixel information for the obscuring window to an off-screen bitmap; and
   combine the pixel information from the off-screen bitmap with pixel information for the indicated window; and
   render the combined pixel information to render the obscuring window at least partially transparent.

18. The system of claim 13, wherein as part of said rendering each of the one or more obscuring windows the program instructions are further executable to render each obscuring window multiple times with an increased level of transparency for each rendering resulting in a visibly graduated change from opacity to transparency.

19. The system of claim 13, wherein as part of said rendering each of the one or more obscuring windows the program instructions are further executable to render each of the obscuring windows as opaque; and
   wherein the program instructions are further executable to implement a graphic subsystem configured to convert pixel information for each obscuring window, resulting from said rendering each of the obscuring windows, to be at least partially transparent.

20. A computer accessible storage medium, storing program instructions computer-executable to implement:
   detecting user input indicating one window of a plurality of windows, wherein respective portions of one or more others of the plurality of windows fully obscure at least a portion of the indicated window; and
   in response to said detecting user input indicating said one window, rendering each of the one or more obscuring windows at least partially transparent such that after rendering each of the obscuring windows, the content of the indicated window is at least partially visible through the respective portions of the obscuring windows that previously fully obscured the portion of the indicated window, wherein said rendering does not change the order of the plurality of windows.

* * * * *